United States Patent [19]

Entmayr et al.

[11] Patent Number: 4,572,262
[45] Date of Patent: Feb. 25, 1986

[54] VEHICLE WHEEL AND PNEUMATIC TIRE ASSEMBLY

[75] Inventors: Peter Entmayr, Burgdorf; Dieter Rohde, Lehrte; Klaus Thielemann, Hildesheim, all of Fed. Rep. of Germany

[73] Assignee: Continental Gummi-Werke Aktiengesellschaft, Hanover, Fed. Rep. of Germany

[21] Appl. No.: 679,469

[22] Filed: Dec. 7, 1984

[30] Foreign Application Priority Data

Dec. 15, 1983 [DE] Fed. Rep. of Germany ....... 3345367

[51] Int. Cl.$^4$ .............................................. B60B 21/00
[52] U.S. Cl. .................................. 152/501; 152/379.3; 152/386
[58] Field of Search ................. 152/330 RF, 165, 157, 152/158, 155, 279.3, 380, 383, 386, 325, 323, 322, 384, 385, 324

[56] References Cited

U.S. PATENT DOCUMENTS

| 1,815,507 | 7/1931 | Harter | 152/325 |
| 2,083,766 | 6/1937 | Wittkopp | 152/379.3 |
| 2,166,127 | 7/1939 | Brunswick | 152/328 |
| 3,288,193 | 11/1966 | Mantzel | 152/158 |
| 3,682,218 | 8/1972 | Johannson et al. | 152/158 |
| 4,091,854 | 3/1978 | French et al. | 152/158 |
| 4,171,676 | 10/1979 | Kennel | 152/330 A |
| 4,325,422 | 4/1982 | Corner et al. | 152/379.3 |
| 4,408,647 | 10/1983 | Kuhn et al. | 152/330 RF |
| 4,467,852 | 8/1984 | Ippen et al. | 152/330 RF |

Primary Examiner—Michael Ball
Attorney, Agent, or Firm—Becker & Becker, Inc.

[57] ABSTRACT

A vehicle wheel and pneumatic tire assembly, including a tire which essentially comprises rubber or rubber-like synthetic material, and a rigid rim which on the radially inner periphery of the rim ring has seating surfaces for the tire, from where the tire walls initially extend essentially horizontally toward the outside. On the radially inner periphery, the rim ring is provided with support surfaces for supporting the tire during an emergency operation. In order to be able to transmit increased forces during an emergency operation, the inner wall of the tire, in the region of the tread, and the radially outer portions of the rim, are provided with raised portions and recessed portions which predominantly extend in the transverse direction, and which are adapted to engage in one another during an emergency operation of the tire.

10 Claims, 5 Drawing Figures

VEHICLE WHEEL AND PNEUMATIC TIRE ASSEMBLY

BACKGROUND OF THE INVENTION

The present invention relates to a vehicle wheel and pneumatic tire assembly, including a tire which essentially comprises rubber or rubber-like synthetic material, and a rigid rim, which on the radially inner periphery of the rim ring has seating surfaces for the tire, from which the tire walls initially extend essentially horizontally outwardly; on the radially outer periphery, the rim ring is provided with support surfaces for supporting the tire during an emergency operation.

A vehicle wheel of this general type is known, for example, from U.S. Pat. No. 4,408,647, issued on Oct. 11, 1983 to the assignee of the present application. Such a vehicle wheel has proven itself to the extent that when pressure is lost due to a blow out, etc., the tire can still be driven over a considerable distance without permanently damaging the tire.

However, when such a wheel is used on heavy vehicles, for example trucks or armored military vehicles, when air pressure is lost the friction between the tire and the rim may be so little that the rim turns within the tire, so that a driving force cannot be transmitted to the tire, and hence to the ground or roadway.

It is therefore an object of the present invention to provide a vehicle wheel and pneumatic tire assembly of the aforementioned general type which eliminates the described difficulties.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
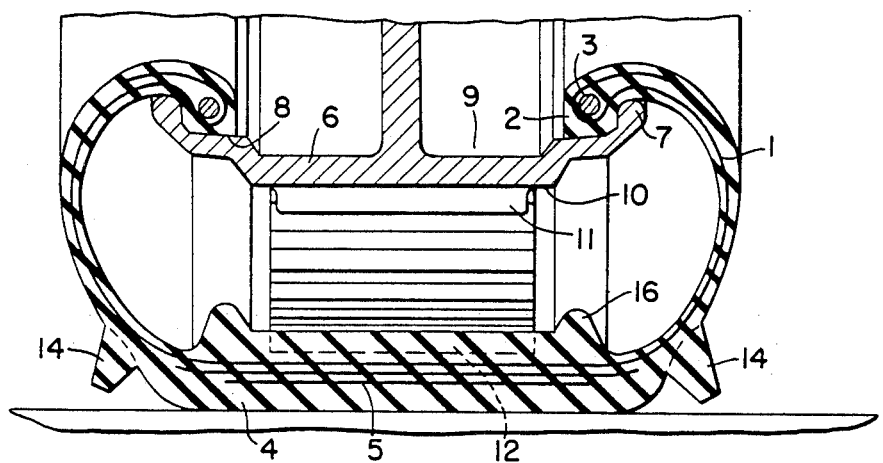
FIG. 1 is a radial partial section through one inventive embodiment of a vehicle wheel and pneumatic tire assembly in the inflated state.

The vehicle wheel and pneumatic tire assembly of the present invention is characterized primarily in that the inner wall of the tire, in the region of the tread, and the radially outer portion of the rim, are provided with raised portions and recessed portions which extend predominantly in the transverse direction, and which engage one another during an emergency operation of the tire.

Within the scope of the present invention, emergency operation refers to a driving condition in which at least one of the pneumatic vehicle tires is without pressure, with the air having escaped from the tire due to a puncture or a blow out, or being let out on purpose. A particularly advantageous embodiment of the present invention is one in which the raised portions and the recessed portions on the tire and the rim are in the form of teeth and grooves, and form a tooth-wheel drive, so that the tire acts like a toothed belt, and the rim acts like a toothed wheel. As a result, it is possible to transfer very strong forces. However, so that these forces are also reliably transferred to the roadway or to the ground in difficult terrain, it is proposed pursuant to a further embodiment of the present invention to dispose the large profiled ribs on the sides next to the tread itself. These profiled ribs should maintain a fairly large space from one another, and should have such a height that they only become completely effective during an emergency operation, at which time they can engage the ground in a tooth-like manner. A vehicle wheel and pneumatic tire assembly of this type can be used, as an example, in such a way that it can be driven in the inflated state on solid streets as high speeds; when difficult terrain is encountered, or a road no longer exists, air can be let out of the tires in order to transmit high driving forces.

Due to the positive engagement between the inner wall of the tire and the outer portion of the rim, it is necessary during an emergency operation to extensively disconnect the tire beads and the associated rim seating surfaces, so that a relative movement is possible without destroying the tire beads. This is made possible by applying a lubricant layer to the tire beads or to the rim seating surfaces, or by mounting the tire beads under prestress in the form of torque, which during an emergency operation effects a pivoting away of the beads from the rim seating surfaces.

Pursuant to further advantageous specific features of the present invention, the raised portions and the recessed portions, especially in the form of a tooth-wheel drive, may be located in the central third of the rim and of the oppositely located inner wall region of the tire, whereas in the adjacent thirds, the inner wall of the tire is adapted to rest flushly on the rim supporting surface during an emergency operation.

The raised portions and the recessed portions may alternately be disposed in the two outer thirds of the rim and the oppositely located inner wall region of the tire.

Means may be provided on the inner wall of the tire and/or on the rim for effecting lateral guidance of the tire during an emergency operation.

DESCRIPTION OF PREFERRED EMBODIMENTS

Referring now to the drawings in detail, in the vehicle wheel and pneumatic tire assembly illustrated in FIG. 1, the tire essentially comprises rubber or rubber-like synthetic material, and has a radial carcass 1 which is anchored in the tire beads 2 by being looped around pull-resistant and compression-resistant bead cores 3. The load-carrying-cords of the carcass 1 can be disposed in one or more plies, and comprise textile threads or metallic wires or cables. A conventional belt 5 is disposed between the tread 4 and the carcass 1.

Toward the outsides, the rim 6 is provided with rim flanges 7 which essentially extend radially inwardly; disposed next to the rim flanges 7 on the radially inner side of the rim ring, are seating surfaces 8 for the tire. Axially inwardly of, and adjacent to, the seating surfaces 8 are deep beds or drop-centers 9, which make it possible to mount the tire on the rim 6, which is preferably in one piece. In the vicinity of the rim flanges 7, the tire walls extend nearly horizontally laterally or axially outwardly.

On the radially outer side, in the region opposite the drop-centers 9, the rim ring is provided with a support surface 10 having crosspiece-like, transversely extending teeth 11 of a tooth-wheel drive; these teeth 11 can also serve as support surfaces for the tire during an emergency operation. The cross sectional shape of the teeth 11 can have the customary toothed belt design, such as being trapezoidal or rounded.

Figure 3:
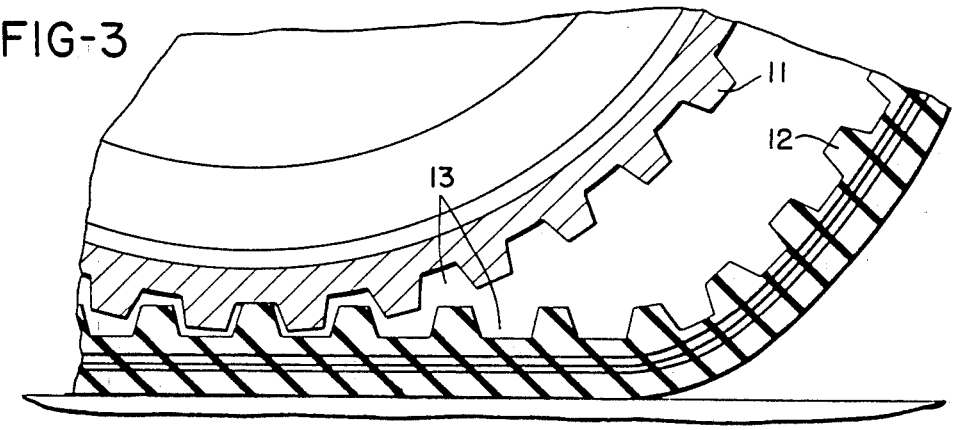
FIG. 3 is a section taken along the line III—III in FIG. 2.

Located on the inner side of the tire, in the region below the tread 4, are corresponding cross-piece-like, transversely extending teeth 12, which during an emergency operation extend into the grooves 13 between the teeth 11 of the rim 6 in order to mesh with the teeth 11 (FIG. 3). Thus, during an emergency operation, in the region of the tire support surface, the tire and the rim 6 form, so to speak, a toothed belt drive, with which extremely great drive forces can be transmitted from the rim 6 to the tire. So that these forces can especially in difficult terrain also be transmitted from the tire to a soft and muddy ground, the outside of the tire, in the region of the tire shoulder, is additionally provided with profiled ribs 14 which only become completely effective in the emergency operation position, and which in the circumferential direction are spaced apart to such an extent that, so to speak, they form a further toothed drive with the ground. If necessary, it is, of course, also possible to provide several rows of additional ribs 14 on each side, whereby it is also possible for the rows to partially extend into one another.

Figure 2:
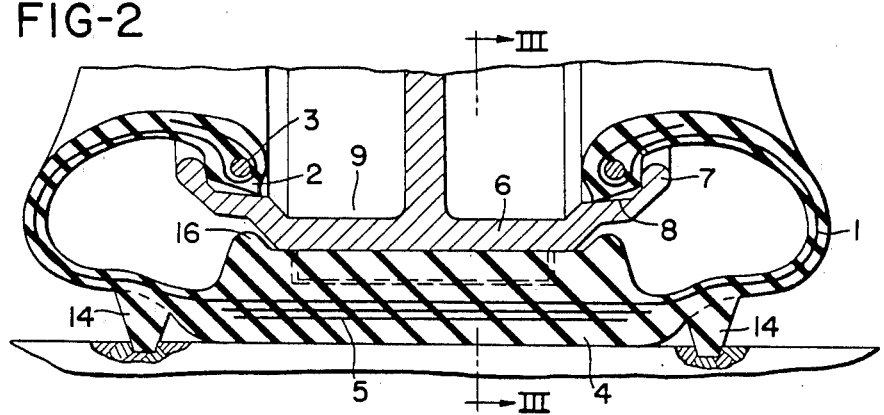
FIG. 2 is a radial partial section of the assembly of FIG. 1 in an emergency operation position.

Since during an emergency operation (see FIG. 2), the tire positively engages the rim 6 in the region of the tread 4, so that no slippage is possible, to compensate for the difference in circumferential length between the tread 4 and the rim 6, the tire must be able to move relative to the rim 6 in the bead region, i.e. a disconnection must take place. This can be achieved, for example, by mounting the tire beads 2 under prestress, so that when pressure is lost, the beads 2 will pivot out of the mounted position on their own. Furthermore, to reduce friction during an emergency operation, lubricant layers 15 can be provided on the tire or on the rim 6 in the bead region of the tire (see FIG. 5). So that the tire is prevented from shifting to the side during an emergency operation, it is provided with two circumferential raised portions 16 adjacent to the toothed portion. As shown in FIG. 2, the raised portions 16 accommodate between them the rim support surface, and can also be coated with a lubricant layer.

Figure 4:
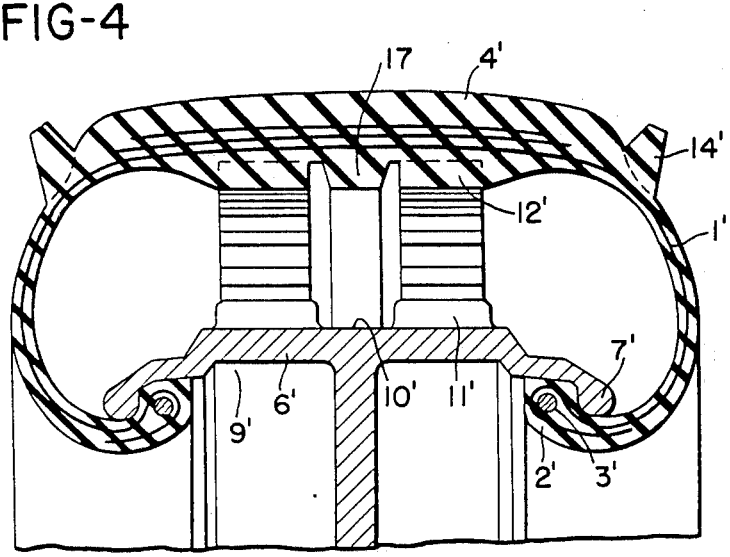
FIG. 4 is a radial partial section through another inventive embodiment of a vehicle wheel and pneumatic tire assembly having two lateral tooth-wheel drives.

In the arrangement illustrated in FIG. 4, the toothed drive of the rim 6' in the tire does not extend over the entire width of the rim support suface 10'; instead, it only covers approximately the two outer thirds of this region. Disposed between the teeth 12' of the tire is a circumferential raised element 17, which during an emergency operation can be supported on the central portion of the rim support surface 10', and then at the same time assumes a lateral guiding function for the tire. The remaining portions of the tire and the rim 6' resemble those of the previously described vehicle wheel and pneumatic tire assembly.

Figure 5:
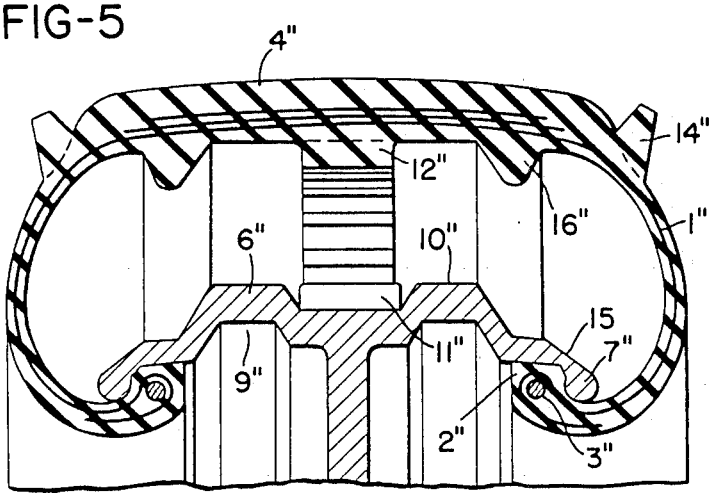
FIG. 5 is a partial radial section through a further inventive embodiment of a vehicle wheel and pneumatic tire assembly having a central tooth-wheel drive.

The arrangement in FIG. 5 differs from that of FIG. 4 primarily in that the teeth 11" and 12" of the toothed drive of the rim 6' and the tire are disposed approximately in the middle third of the region of the rim support surface 10", while the adjacent thirds rest flushly on the rim support surface 10" during an emergency operation of the tire. Two raised portions 16" serve to guide the tire in a manner similar to that described in connection with the embodiment of FIG. 1.

Although in connection with the described vehicle wheel and pneumatic tire assembly the teeth on the rim are normally made of metal and the teeth on the tire are normally a hard rubber, if necessary, in order to reduce weight, all of the teeth can be made of a light synthetic material.

It should be noted that in order to mount the tire on a one-piece rim, the rim is first of all introduced into the tire at nearly right angles thereto, and is then turned within the tire, so that the two tire beads are disposed on the outside next to the appropriate rim flanges. From that point, mounting is effected in the customary manner.

The present invention is, of course, in no way restricted to the specific disclosure of the specification and drawings, but also encompasses any modifications within the scope of the appended claims.

What we claim is:

1. A vehicle wheel and pneumatic tire assembly, which includes a tire made essentially of rubber or rubber-like synthetic material and having a tread and an inner wall, and also includes a rigid rim, the radially inner periphery of the rim ring of which has seating surfaces to allow mounting of said tire on said rim; the walls of said tire initially extend essentially horizontally outwardly from said seating surfaces; the radially outer periphery of said rim ring is provided with support surface means for supporting said tire during an emergency operation;

the improvement wherein said inner wall of said tire, in the region of said tread, and said support surface means, are both provided with alternating raised portions and recessed portions, which predominantly extend transverses to the circumferential direction of said tire, and are adpated to interengage during an emergency operation of said tire.

2. A vehicle wheel and pneumatic tire assembly according to claim 1, in which said raised portions are in the form of teeth, and said recessed portions are in the form of grooves; during an emergency operation, said teeth and said grooves form a tooth-wheel drive.

3. A vehicle wheel and pneumatic tire assembly according to claim 2, in which said support surface means of said rim ring, when viewed in a radial section, is divided into thirds, with said teeth and grooves being disposed in the central third of said support surface means, and on the oppositely-located inner wall region of said tire; during an emergency operation, those portions of said inner wall of said tire disposed adjacent to said teeth and grooves thereof are adapted to rest flushly on those lateral thirds of said support surface means disposed adjacent to said central third thereof.

4. A vehicle wheel and pneumatic tire assembly according to claim 2, in which said support surface means of said rim ring, when viewed in a radial section, is divided into thirds, with said teeth and grooves being disposed in both of the outer thirds of said support surface means, and on the oppositely-located inner wall region of said tire.

5. A vehicle wheel and pneumatic tire assembly according to claim 2, in which at least one of said rim and said inner wall of said tire is provided with means for effecting lateral guidance of said tire during an emergency operation.

6. A vehicle wheel and pneumatic tire assembly according to claim 5, in which said inner wall of said tire is provided with two circumferentially extending raised portions on axially opposite sides of said teeth of said inner wall.

7. A vehicle wheel and pneumatic tire assembly according to claim 5, in which the central portion of said inner wall of said tire is provided with a circumferentially extending raised element.

8. A vehicle wheel and pneumatic tire assembly according to claim 1, in which, adjacent to said tread, said tire is externally provided with additional ribs, which during an emergency operation engage the surface on which said tire is being driven.

9. A vehicle wheel and pneumatic tire assembly according to claim 1, in which said tire includes bead portions which are adapted to be seated on said seating surfaces when said tire is mounted on said rim; said bead portions and said rim seating surfaces are, to a large extent, adapted to be disconnected during an emergency operation.

10. A vehicle wheel and pneumatic tire assembly according to claim 9, which includes a lubricant layer on at least one of said bead portions and said rim seating surfaces to effect said disconnection.

* * * * *